United States Patent
Baumann (10) Patent No.: US 11,855,898 B1
(45) Date of Patent: Dec. 26, 2023

(54) METHODS FOR TRAFFIC DEPENDENT DIRECT MEMORY ACCESS OPTIMIZATION AND DEVICES THEREOF

(71) Applicant: F5 Networks, Inc., Seattle, WA (US)

(72) Inventor: William Ross Baumann, Seattle, WA (US)

(73) Assignee: F5, Inc., Seattle, WA (US)

( * ) Notice: Subject to any disclaimer, the term of this patent is extended or adjusted under 35 U.S.C. 154(b) by 0 days.

(21) Appl. No.: 16/353,868

(22) Filed: Mar. 14, 2019

Related U.S. Application Data (60) Provisional application No. 62/642,725, filed on Mar. 14, 2018.

(51) Int. Cl.
| | | |
|---|---|---|
| *H04L 47/2441* | (2022.01) | |
| *H04L 69/22* | (2022.01) | |
| *G06F 16/9035* | (2019.01) | |
| *H04L 12/46* | (2006.01) | |
| *H04L 61/5007* | (2022.01) | |

(52) U.S. Cl.
CPC ...... *H04L 47/2441* (2013.01); *G06F 16/9035* (2019.01); *H04L 69/22* (2013.01); *H04L 12/4641* (2013.01); *H04L 61/5007* (2022.05)

(58) Field of Classification Search
None
See application file for complete search history.

(56) References Cited

U.S. PATENT DOCUMENTS

| | | |
|---|---|---|
| 4,914,650 A | 4/1990 | Sriram |
| 5,388,237 A | 2/1995 | Sodos |
| 5,477,541 A | 12/1995 | White et al. |
| 5,588,128 A | 12/1996 | Hicok et al. |
| 5,699,361 A | 12/1997 | Ding et al. |
| 5,742,765 A | 4/1998 | Wong et al. |
| 5,761,534 A | 6/1998 | Lundberg et al. |

(Continued)

FOREIGN PATENT DOCUMENTS

| | | |
|---|---|---|
| EP | 0803819 | 10/1997 |
| EP | 1813084 | 8/2007 |

(Continued)

OTHER PUBLICATIONS

"Cavium Networks Product Selector Guide," Single & Multi-Core MIPS Processors, Security Processors and Accelerator Boards, Cavium Networks, pp. 1-44, Spring 2008.

(Continued)

*Primary Examiner* — Christopher T Wyllie
(74) *Attorney, Agent, or Firm* — Troutman Pepper Hamilton Sanders LLP (F5 PATENTS)

(57) ABSTRACT

Methods, non-transitory computer readable media, network traffic management apparatuses, and network traffic management systems include inspecting a plurality of incoming packets to obtain packet header data for each of the incoming packets. The packet header data is filtered using one or more filtering criteria. At least one of a plurality of optimized DMA behavior mechanisms for each of the incoming packets are selected based on associating the filtered header data for each of the incoming packets with stored profile data. The incoming packets are disaggregated based on the corresponding selected one of the optimized DMA behavior mechanisms.

20 Claims, 7 Drawing Sheets

(56) References Cited

U.S. PATENT DOCUMENTS

| | | | |
|---|---|---|---|
| 5,797,033 A * | 8/1998 | Ecclesine | G06F 13/28 711/119 |
| 5,809,334 A | 9/1998 | Galdun et al. | |
| 5,809,560 A | 9/1998 | Schneider | |
| 5,828,835 A | 10/1998 | Isfeld et al. | |
| 5,940,838 A | 8/1999 | Schmuck et al. | |
| 5,941,988 A | 8/1999 | Bhagwat et al. | |
| 5,948,080 A | 9/1999 | Baker | |
| 6,026,090 A | 2/2000 | Benson et al. | |
| 6,026,443 A | 2/2000 | Oskouy et al. | |
| 6,055,619 A * | 4/2000 | North | G10H 7/002 712/35 |
| 6,070,219 A | 5/2000 | McAlpine et al. | |
| 6,070,230 A | 5/2000 | Capps | |
| 6,115,802 A | 9/2000 | Tock et al. | |
| 6,347,337 B1 | 2/2002 | Shah et al. | |
| 6,347,347 B1 | 2/2002 | Brown et al. | |
| 6,385,624 B1 | 5/2002 | Shinkai | |
| 6,388,989 B1 | 5/2002 | Malhortra | |
| 6,529,508 B1 | 3/2003 | Li et al. | |
| 6,574,220 B1 | 6/2003 | Petty | |
| 6,647,438 B1 * | 11/2003 | Connor | G06F 13/28 710/36 |
| 6,700,871 B1 | 3/2004 | Harper et al. | |
| 6,748,457 B2 | 6/2004 | Fallon et al. | |
| 6,781,990 B1 | 8/2004 | Puri et al. | |
| 6,785,236 B1 | 8/2004 | Lo et al. | |
| 6,820,133 B1 | 11/2004 | Grove et al. | |
| 6,904,040 B2 | 4/2005 | Salapura et al. | |
| 6,915,404 B1 | 7/2005 | Desai et al. | |
| 6,934,776 B2 | 8/2005 | Connor et al. | |
| 6,999,457 B2 | 2/2006 | Shinohara | |
| 7,046,628 B2 | 5/2006 | Luhmann et al. | |
| 7,065,630 B1 | 6/2006 | Ledebohm et al. | |
| 7,107,348 B2 | 9/2006 | Shimada et al. | |
| 7,117,308 B1 | 10/2006 | Mitten et al. | |
| 7,120,753 B2 | 10/2006 | Accapadi et al. | |
| 7,124,196 B2 | 10/2006 | Hooper | |
| 7,142,540 B2 | 11/2006 | Hendel et al. | |
| 7,164,678 B2 | 1/2007 | Connor | |
| 7,174,393 B2 | 2/2007 | Boucher et al. | |
| 7,181,457 B2 | 2/2007 | Reinauer et al. | |
| 7,203,815 B2 | 4/2007 | Haswell | |
| 7,236,491 B2 | 6/2007 | Tsao et al. | |
| 7,272,150 B2 | 9/2007 | Bly et al. | |
| 7,281,030 B1 | 10/2007 | Davis | |
| 7,324,525 B2 | 1/2008 | Fuhs et al. | |
| 7,327,674 B2 | 2/2008 | Eberle et al. | |
| 7,349,405 B2 | 3/2008 | Deforche | |
| 7,353,326 B2 | 4/2008 | Cho et al. | |
| 7,355,977 B1 | 4/2008 | Li | |
| 7,359,321 B1 | 4/2008 | Sindhu et al. | |
| 7,376,772 B2 | 5/2008 | Fallon | |
| 7,403,542 B1 | 7/2008 | Thompson | |
| 7,411,957 B2 | 8/2008 | Stacy et al. | |
| 7,415,034 B2 | 8/2008 | Muller et al. | |
| 7,420,931 B2 | 9/2008 | Nanda et al. | |
| 7,457,313 B2 | 11/2008 | Patrick | |
| 7,475,122 B2 | 1/2009 | Azpitarte | |
| 7,478,186 B1 | 1/2009 | Onufryk et al. | |
| 7,493,398 B2 | 2/2009 | Bush | |
| 7,496,689 B2 | 2/2009 | Sharp et al. | |
| 7,496,695 B2 | 2/2009 | Go et al. | |
| 7,500,028 B2 | 3/2009 | Yamagishi | |
| 7,512,078 B2 | 3/2009 | Swain | |
| 7,512,721 B1 | 3/2009 | Olson | |
| 7,533,197 B2 | 5/2009 | Leonard et al. | |
| 7,552,232 B2 | 6/2009 | Helmer, Jr. et al. | |
| 7,558,910 B2 | 7/2009 | Alverson et al. | |
| 7,571,299 B2 | 8/2009 | Loeb | |
| 7,590,753 B2 | 9/2009 | Wolde et al. | |
| 7,620,046 B2 | 11/2009 | Ronciak et al. | |
| 7,620,071 B2 | 11/2009 | Makineni et al. | |
| 7,621,162 B2 | 11/2009 | Bartky | |
| 7,647,416 B2 | 1/2010 | Chiang et al. | |
| 7,649,882 B2 | 1/2010 | Stiliadis | |
| 7,657,659 B1 | 2/2010 | Lambeth et al. | |
| 7,660,916 B2 | 2/2010 | Moskalev et al. | |
| 7,668,727 B2 | 2/2010 | Mitchell et al. | |
| 7,668,851 B2 | 2/2010 | Triplett | |
| 7,710,989 B2 | 5/2010 | Chew | |
| 7,729,239 B2 | 6/2010 | Aronov et al. | |
| 7,734,809 B2 | 6/2010 | Joshi et al. | |
| 7,735,099 B1 | 6/2010 | Micalizzi, Jr. | |
| 7,742,412 B1 | 6/2010 | Medina | |
| 7,784,093 B2 | 8/2010 | Deng et al. | |
| 7,813,277 B2 | 10/2010 | Okholm et al. | |
| 7,826,487 B1 | 11/2010 | Mukerji et al. | |
| 7,835,391 B2 | 11/2010 | Chateau et al. | |
| 7,840,841 B2 | 11/2010 | Huang et al. | |
| 7,877,524 B1 | 1/2011 | Annem et al. | |
| 7,916,728 B1 | 3/2011 | Mimms | |
| 7,929,433 B2 | 4/2011 | Husak et al. | |
| 7,930,444 B2 | 4/2011 | Shasha et al. | |
| 7,936,772 B2 | 5/2011 | Kashyap | |
| 7,975,025 B1 | 7/2011 | Szabo et al. | |
| 7,991,918 B2 | 8/2011 | Jha et al. | |
| 7,996,569 B2 | 8/2011 | Aloni et al. | |
| 8,001,430 B2 | 8/2011 | Shasha et al. | |
| 8,006,016 B2 | 8/2011 | Muller et al. | |
| 8,077,620 B2 | 12/2011 | Solomon et al. | |
| 8,099,528 B2 | 1/2012 | Millet et al. | |
| 8,103,809 B1 | 1/2012 | Michels et al. | |
| 8,112,491 B1 | 2/2012 | Michels et al. | |
| 8,112,594 B2 | 2/2012 | Giacomoni et al. | |
| 8,233,380 B2 | 7/2012 | Subramanian et al. | |
| 8,274,976 B2 * | 9/2012 | Aloni | H04L 47/193 709/219 |
| 8,279,865 B2 | 10/2012 | Giacomoni et al. | |
| 8,306,036 B1 | 11/2012 | Bollay et al. | |
| 8,346,993 B2 | 1/2013 | Michels et al. | |
| 8,417,842 B2 | 4/2013 | Vu | |
| 8,447,884 B1 | 5/2013 | Baumann | |
| 8,447,897 B2 | 5/2013 | Xu et al. | |
| 8,448,234 B2 | 5/2013 | Mondaeev et al. | |
| 8,630,173 B2 | 1/2014 | Sundar | |
| 8,762,595 B1 * | 6/2014 | Muller | G06F 13/385 710/33 |
| 8,799,403 B2 | 8/2014 | Chan et al. | |
| 8,848,715 B2 | 9/2014 | Izenberg et al. | |
| 8,880,632 B1 | 11/2014 | Michels et al. | |
| 8,880,696 B1 | 11/2014 | Michels et al. | |
| 8,984,178 B2 | 3/2015 | Michels et al. | |
| 9,032,113 B2 | 5/2015 | Conroy et al. | |
| 9,036,822 B1 | 5/2015 | Jain et al. | |
| 9,152,483 B2 | 10/2015 | Michels et al. | |
| 9,270,602 B1 | 2/2016 | Michels et al. | |
| 9,313,047 B2 | 4/2016 | Michels et al. | |
| 10,177,795 B1 * | 1/2019 | Frishman | G06F 11/1004 |
| 2001/0038629 A1 | 11/2001 | Shinohara | |
| 2001/0042200 A1 | 11/2001 | Lamberton et al. | |
| 2001/0043614 A1 * | 11/2001 | Viswanadham | H04L 49/602 370/469 |
| 2002/0133586 A1 * | 9/2002 | Shanklin | H04L 43/06 709/224 |
| 2002/0143955 A1 | 10/2002 | Shimada et al. | |
| 2002/0156927 A1 | 10/2002 | Boucher et al. | |
| 2003/0067930 A1 * | 4/2003 | Salapura | H04L 49/90 370/428 |
| 2003/0204636 A1 | 10/2003 | Greenblat et al. | |
| 2004/0013117 A1 | 1/2004 | Hendel et al. | |
| 2004/0032830 A1 | 2/2004 | Bly et al. | |
| 2004/0062245 A1 | 4/2004 | Sharp et al. | |
| 2004/0098538 A1 | 5/2004 | Horn et al. | |
| 2004/0202161 A1 | 10/2004 | Stachura et al. | |
| 2004/0249881 A1 | 12/2004 | Jha et al. | |
| 2004/0249948 A1 | 12/2004 | Sethi et al. | |
| 2004/0267897 A1 | 12/2004 | Hill et al. | |
| 2005/0007991 A1 | 1/2005 | Ton et al. | |
| 2005/0050364 A1 | 3/2005 | Feng | |
| 2005/0063307 A1 | 3/2005 | Samuels et al. | |
| 2005/0083952 A1 | 4/2005 | Swain | |
| 2005/0091390 A1 | 4/2005 | Helmer et al. | |
| 2005/0114559 A1 | 5/2005 | Miller | |

(56) References Cited

U.S. PATENT DOCUMENTS

| | | |
|---|---|---|
| 2005/0141427 A1 | 6/2005 | Bartky |
| 2005/0144394 A1 | 6/2005 | Komaria et al. |
| 2005/0154825 A1 | 7/2005 | Fair |
| 2005/0175014 A1 | 8/2005 | Patrick |
| 2005/0193164 A1* | 9/2005 | Royer .................. G06F 12/0866 711/E12.019 |
| 2005/0213570 A1 | 9/2005 | Stacy et al. |
| 2005/0226234 A1 | 10/2005 | Sano et al. |
| 2006/0007928 A1 | 1/2006 | Sangillo |
| 2006/0015618 A1 | 1/2006 | Freimuth et al. |
| 2006/0067349 A1 | 3/2006 | Ronciak et al. |
| 2006/0104303 A1 | 5/2006 | Makineni et al. |
| 2006/0174324 A1 | 8/2006 | Zur et al. |
| 2006/0221832 A1 | 10/2006 | Muller et al. |
| 2006/0221835 A1 | 10/2006 | Sweeney |
| 2006/0221990 A1* | 10/2006 | Muller .................. H04L 47/326 370/395.43 |
| 2006/0224820 A1 | 10/2006 | Cho et al. |
| 2006/0235996 A1 | 10/2006 | Wolde et al. |
| 2006/0271740 A1 | 11/2006 | Mark et al. |
| 2006/0288128 A1 | 12/2006 | Moskalev et al. |
| 2007/0005904 A1 | 1/2007 | Lemoal et al. |
| 2007/0073915 A1* | 3/2007 | Go .......................... G06F 13/28 710/11 |
| 2007/0094452 A1 | 4/2007 | Fachan |
| 2007/0106849 A1 | 5/2007 | Moore et al. |
| 2007/0162619 A1 | 7/2007 | Aloni et al. |
| 2008/0040538 A1 | 2/2008 | Matsuzawa et al. |
| 2008/0126509 A1 | 5/2008 | Subramanian et al. |
| 2008/0184248 A1 | 7/2008 | Barua et al. |
| 2008/0201772 A1 | 8/2008 | Mondaeev et al. |
| 2008/0219159 A1 | 9/2008 | Chateau et al. |
| 2008/0219279 A1 | 9/2008 | Chew |
| 2009/0003204 A1 | 1/2009 | Okholm et al. |
| 2009/0007266 A1 | 1/2009 | Wu et al. |
| 2009/0016217 A1 | 1/2009 | Kashyap |
| 2009/0089619 A1 | 4/2009 | Huang et al. |
| 2009/0106470 A1* | 4/2009 | Sharma .................. G06F 13/385 710/301 |
| 2009/0138420 A1 | 5/2009 | Swift et al. |
| 2009/0144130 A1 | 6/2009 | Grouf et al. |
| 2009/0154459 A1 | 6/2009 | Husak et al. |
| 2009/0222598 A1 | 9/2009 | Hayden |
| 2009/0248911 A1 | 10/2009 | Conroy et al. |
| 2009/0279559 A1 | 11/2009 | Wong et al. |
| 2010/0023595 A1 | 1/2010 | McMillan |
| 2010/0082849 A1 | 4/2010 | Millet et al. |
| 2010/0085875 A1 | 4/2010 | Solomon et al. |
| 2010/0094945 A1 | 4/2010 | Chan et al. |
| 2010/0174824 A1* | 7/2010 | Aloni .................... G06F 13/128 709/230 |
| 2011/0110380 A1 | 5/2011 | Muller et al. |
| 2011/0134915 A1* | 6/2011 | Srinivasan ............... G06F 13/28 370/389 |
| 2011/0228781 A1 | 9/2011 | Izenberg et al. |
| 2011/0258337 A1* | 10/2011 | Wang ...................... H04L 65/65 709/231 |
| 2011/0307663 A1* | 12/2011 | Kultursay ............... G06F 30/30 711/E12.041 |
| 2012/0191800 A1 | 7/2012 | Michels et al. |
| 2012/0195192 A1 | 8/2012 | Matthews |
| 2013/0166793 A1* | 6/2013 | Shahar .................... G06F 13/28 710/26 |
| 2013/0250777 A1 | 9/2013 | Ziegler |
| 2014/0032695 A1 | 1/2014 | Michels et al. |
| 2014/0185442 A1 | 7/2014 | Newman et al. |
| 2014/0301207 A1 | 10/2014 | Durand et al. |
| 2017/0235702 A1* | 8/2017 | Horie ...................... G06F 3/067 709/212 |
| 2018/0322913 A1* | 11/2018 | Friedman .................. G11C 8/18 |
| 2019/0163441 A1* | 5/2019 | Hagspiel .................. G06F 12/04 |
| 2019/0392297 A1* | 12/2019 | Lau .......................... G06F 17/16 |
| 2021/0152659 A1* | 5/2021 | Cai ...................... H04L 41/0813 |

FOREIGN PATENT DOCUMENTS

| | | |
|---|---|---|
| WO | WO 2004/079930 | 9/2004 |
| WO | WO 2006/055494 | 5/2006 |
| WO | WO 2009/158680 | 12/2009 |

OTHER PUBLICATIONS

"Comtech AHA Announces 3.0 Gbps GZIP Compression/Decompression Accelerator, AHA362-PCIX offers high-speed GZIP compression and decompression," News Release, Comtech AHA Corporation, Moscow, ID, pp. 1-2, Apr. 20, 2005.

"Comtech AHA Announces GZIP Compression and Decompression IC Offers the highest speed and compression ratio performance in hardware on the market," News Release, Comtech AHA Corporation, Moscow, ID, pp. 1-2, Jun. 26, 2007.

"Gigabit Ethernet/PCI Network Interface Card; Host/NIC Software Interface Definition," Revision 12.4.13, P/N 020001, Alteon WebSystems, Inc., pp. 1-80, Jul. 1999.

"Memory Mapping and DMA," Linux Device Drivers, Third Edition, Chapter 15, pp. 412-463, Jan. 21, 2005.

"NITROX™ XL Security Acceleration Modules, PCI 3V or 3V/5V-Universal Boards for SSL and IPSec," Cavium Networks, 1 pp, 2002.

"PCI, PCI-X," Cavium Networks, Product Sheet, 1 pp, last retrieved Oct. 24, 2008.

"Plan 9 Kernel History: Overview," Lucent Technologies, pp. 1-16, last accessed Oct. 22, 2007.

Agrawala, Ashok K., "Operating Systems," Operating System Concepts, pp. 1-24, 2004.

"Layer 4/7 Switching and Other Custom IP Traffic Processing Using the NEPPI API," Bell Laboratories, pp. 1-11, 1999.

"Direct Memory Access (DMA) and Interrupt Handling," EventHelix.com, pp. 1-4, last accessed Jan. 29, 2010.

"TCP-Transmission Control Protocol (TCP Fast Retransmit and Recovery)," EventHelix.com, pp. 1-5, Mar. 28, 2002.

Goglin et al., "Performance Analysis of Remote File System Access Over a High-Speed Local Networks," 18$^{th}$ International Parallel and Distributed Processing Symposium, pp. 1-8, Apr. 26-30, 2004.

Harvey et al., "DMA Fundamentals on Various PC Platforms," National Instruments, Application Note 011, pp. 1-18, Apr. 1991.

Kim, Hyong-youb, "TCP Offload Through Connection Handoff," Thesis submitted to Rice University, pp. 1-132, Aug. 2006.

Kurmann et al., "A Comparison of Two Gigabit SAN/LAN Technologies: Scalable Coherent Interface Versus Myrinet," Proceedings of SCI Europe '98 Conference, EMMMSEC'98, pp. 1-12, Sep. 28-30, 1998.

Mangino, John, "Using DMA With High Performance Peripherals to Maximize System Performance," Texas Instruments, pp. 1-23, Jan. 2007.

Mogul, Jeffrey C., "The Case for Persistent-Connection HTTP," ACM SIGCOMM Computer Communication Review, vol. 25, No. 4, pp. 299-313, Oct. 1995.

Moore et al., "Inferring Internet Denial-of-Service Activity," University of California, pp. 1-14, 2000.

Rabinovich et al., "DHTTP: An Efficient and Cache-Friendly Transfer Protocol for the Web," IEEE/ACM Transactions on Networking, vol. 12, No. 6, pp. 1007-1020, Dec. 2004.

Salchow, Jr., KJ, "Clustered Multiprocessing: Changing the Rules of the Performance Game," F5 Networks, Inc., White Paper, pp. 1-11, 2008.

Stevens, W., "TCP Slow Start, Congestion Avoidance, Fast Retransmit, and Fast Recovery Algorithms," Network Working Group, Request for Comments 2001, Standards Track, pp. 1-6, Jan. 1997.

Wadge, Wallace, "Achieving Gigabit Performance on Programmable Ethernet Network Interface Cards," pp. 1-9, May 29, 2001.

Welch, Von, "A User's Guide to TCP Windows," pp. 1-5, Jun. 19, 1996.

"Direct Memory Access," from Wikipedia, pp. 1-6, Jan. 26, 2010.

"Nagle's Algorithm," from Wikipedia, pp. 1-2, Oct. 9, 2009.

* cited by examiner

METHODS FOR TRAFFIC DEPENDENT DIRECT MEMORY ACCESS OPTIMIZATION AND DEVICES THEREOF

This application claims the benefit of U.S. Provisional Patent Application Ser. No. 62/642,725 filed Mar. 14, 2018, which is hereby incorporated by reference in its entirety.

FIELD

This technology generally relates to traffic dependent direct memory access (DMA) optimization.

BACKGROUND

Today, software and hardware interact in a rigid way. Network interface controllers (NICs) provide only a single DMA (direct memory access) behavior mechanism, such as deciding how to lay down buffers and interact with the driver. With a single DMA behavior mechanism, upon receiving packets by the NICs, the packets are transmitted to a queue. This transmission of the packets into the queue by the NICs is independent of the contents included in the packet and the flow associated with the packet. However, different types of packets based on their content would have increased efficiency if alternate DMA behavior mechanisms were utilized, such as mechanisms with improved use of CPU cache, CPU, or DRAM.

SUMMARY

A method, implemented by a network traffic management system comprising one or more network traffic management apparatuses, server devices or client devices, includes inspecting a plurality of incoming packets to obtain packet header data for each of the incoming packets. The packet header data is filtered using one or more filtering criteria. At least one of a plurality of optimized DMA behavior mechanisms for each of the incoming packets are selected based on associating the filtered header data for each of the incoming packets with stored profile data. The incoming packets are disaggregated based on the corresponding selected one of the optimized DMA behavior mechanisms.

A network traffic management apparatus including memory including programmed instructions stored thereon and one or more processors configured to be capable of executing the stored programmed instructions to inspect a plurality of incoming packets to obtain packet header data for each of the incoming packets. The packet header data is filtered using one or more filtering criteria. At least one of a plurality of optimized DMA behavior mechanisms for each of the incoming packets are selected based on associating the filtered header data for each of the incoming packets with stored profile data. The incoming packets are disaggregated based on the corresponding selected one of the optimized DMA behavior mechanisms.

A non-transitory computer readable medium having stored thereon instructions for including executable code that, when executed by one or more processors, causes the processors to inspect a plurality of incoming packets to obtain packet header data for each of the incoming packets. The packet header data is filtered using one or more filtering criteria. At least one of a plurality of optimized DMA behavior mechanisms for each of the incoming packets are selected based on associating the filtered header data for each of the incoming packets with stored profile data. The incoming packets are disaggregated based on the corresponding selected one of the optimized DMA behavior mechanisms.

A network traffic management system includes one or more traffic management modules, server modules, or client modules, memory comprising programmed instructions stored thereon, and one or more processors configured to be capable of executing the stored programmed instructions to a plurality of incoming packets to obtain packet header data for each of the incoming packets. The packet header data is filtered using one or more filtering criteria. At least one of a plurality of optimized DMA behavior mechanisms for each of the incoming packets are selected based on associating the filtered header data for each of the incoming packets with stored profile data. The incoming packets are disaggregated based on the corresponding selected one of the optimized DMA behavior mechanisms.

This technology has a number of advantages including providing methods, non-transitory computer readable media, network traffic management apparatuses, and network traffic management systems that provide increased efficiency with network load balancing by intelligently processing different types of traffic with a correlated one of a plurality of DMA behavior mechanism. This correlation improves CPU, CPU cache, DRAM or Bus Bandwidth utilization resulting in an improved experience for client devices. As a result, this technology provides optimized utilization of NIC storage to eliminate duplicated data to reduce size of entry tables which reduces costs for utilizing expensive storage devices.

DETAILED DESCRIPTION

Figure 1:
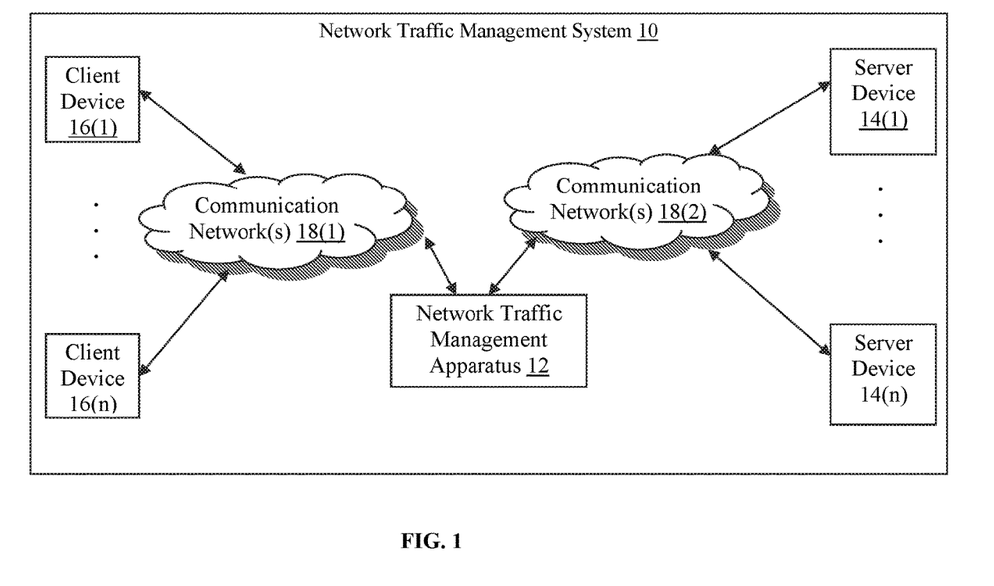
FIG. 1 is a block diagram of an exemplary network traffic management system with a network traffic management apparatus.

Referring to FIG. 1, an exemplary network environment that incorporates an exemplary network traffic management system 10 is illustrated. The network traffic management system 10 in this example includes a network traffic management apparatus 12 that is coupled to server devices 14(1)-14(n), and client devices 16(1)-16(n) via communication network(s) 18(1) and 18(2), although the network traffic management apparatus 12, server devices 14(1)-14(n), and client devices 16(1)-16(n) may be coupled together via other topologies. The network traffic management system 10 may include other network devices such as one or more routers or switches, for example, which are known in the art and thus will not be described herein. This technology provides a number of advantages including methods, non-transitory computer readable media, network traffic management systems, and network traffic management apparatuses that provide an increased efficiency of network load balancing by intelligently processing different types of traffic with a correlated one of a plurality of DMA behavior mechanism.

In this particular example, the network traffic management apparatus 12, server devices 14(1)-14(n), and client devices 16(1)-16(n) are disclosed in FIG. 1 as dedicated hardware devices. However, one or more of the network traffic management apparatus 12, server devices 14(1)-14(n), or client devices 16(1)-16(n) can also be implemented in software within one or more other devices in the network traffic management system 10. As used herein, the term "module" refers to either an implementation as a dedicated hardware device or apparatus, or an implementation in software hosted by another hardware device or apparatus that may be hosting one or more other software components or implementations.

As one example, the network traffic management apparatus 12, as well as any of its components, models, or applications, can be a module implemented as software executing on one of the server devices 14(1)-14(n), and many other permutations and types of implementations can also be used in other examples. Moreover, any or all of the network traffic management apparatus 12, server devices 14(1)-14(n), and client devices 16(1)-16(n), can be implemented, and may be referred to herein, as a module.

Referring to FIGS. 1-4, the network traffic management apparatus of the network traffic management system 10 may perform any number of functions including managing network traffic, load balancing network traffic across the server devices 14(1)-14(n), or accelerating network traffic associated with web applications hosted by the server devices 14(1)-14(n). The network traffic management apparatus 12 in this example includes one or more processor(s) 20, a memory 22, and a communication interface 24, which are coupled together by a bus 26, although the network traffic management apparatus 12 can include other types or numbers of elements in other configurations.

Figure 2:
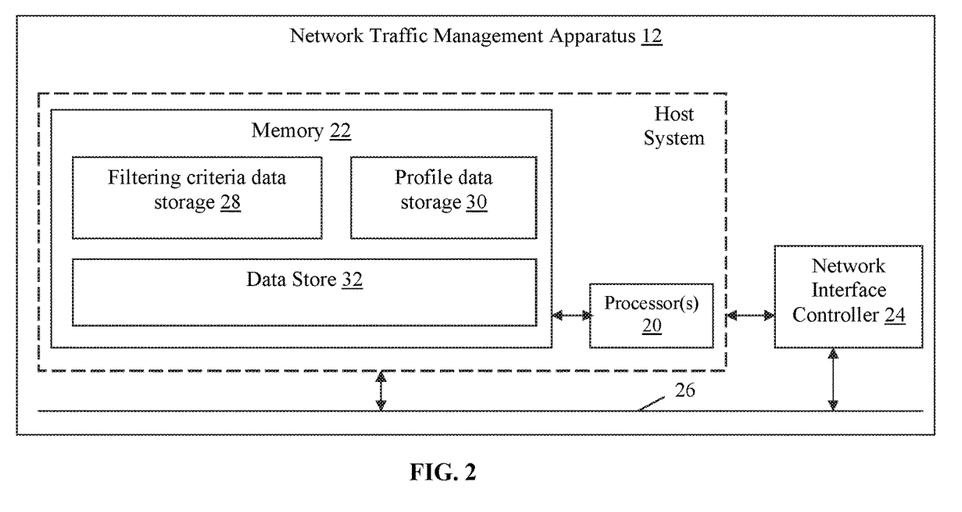
FIG. 2 is a block diagram of an exemplary network traffic management apparatus.

The processor(s) 20 of the network traffic management apparatus 12 may execute programmed instructions stored in the memory 22 of the network traffic management apparatus 12 for any number of the functions identified above. The processor(s) 20 of the network traffic management apparatus 12 may include one or more central processing units (CPUs) or general purpose processors with one or more processing cores, for example, although other types of processor(s) can also be used.

The memory 22 of the network traffic management apparatus 12 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 20, can be used for the memory 22.

Figure 5:
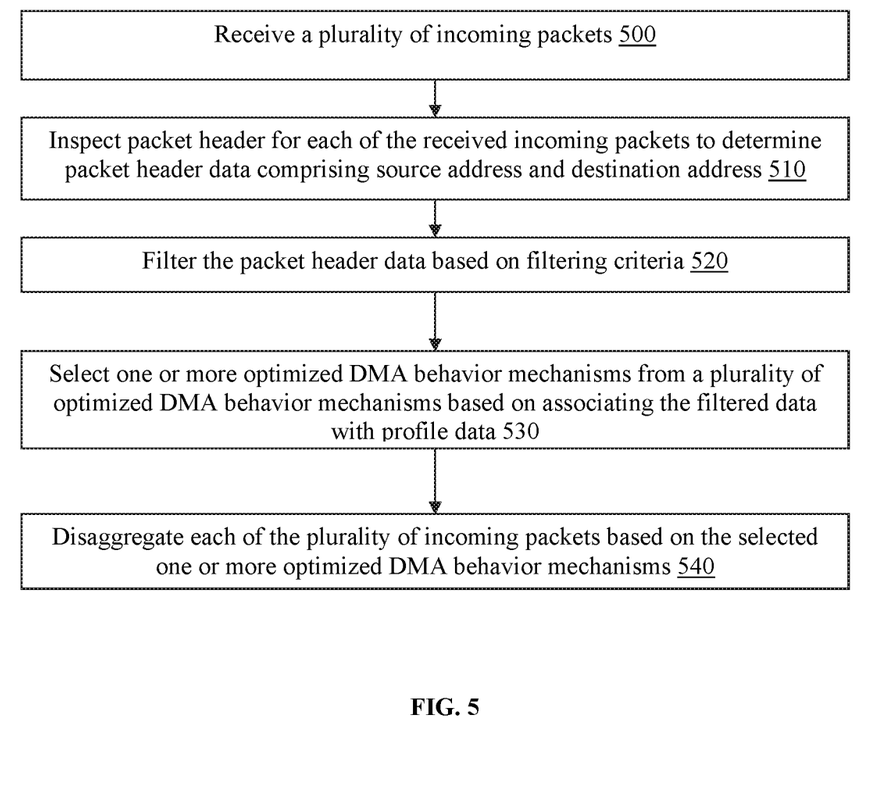
FIG. 5 is a flowchart of an exemplary method for traffic dependent direct memory access optimization.
Figure 6:
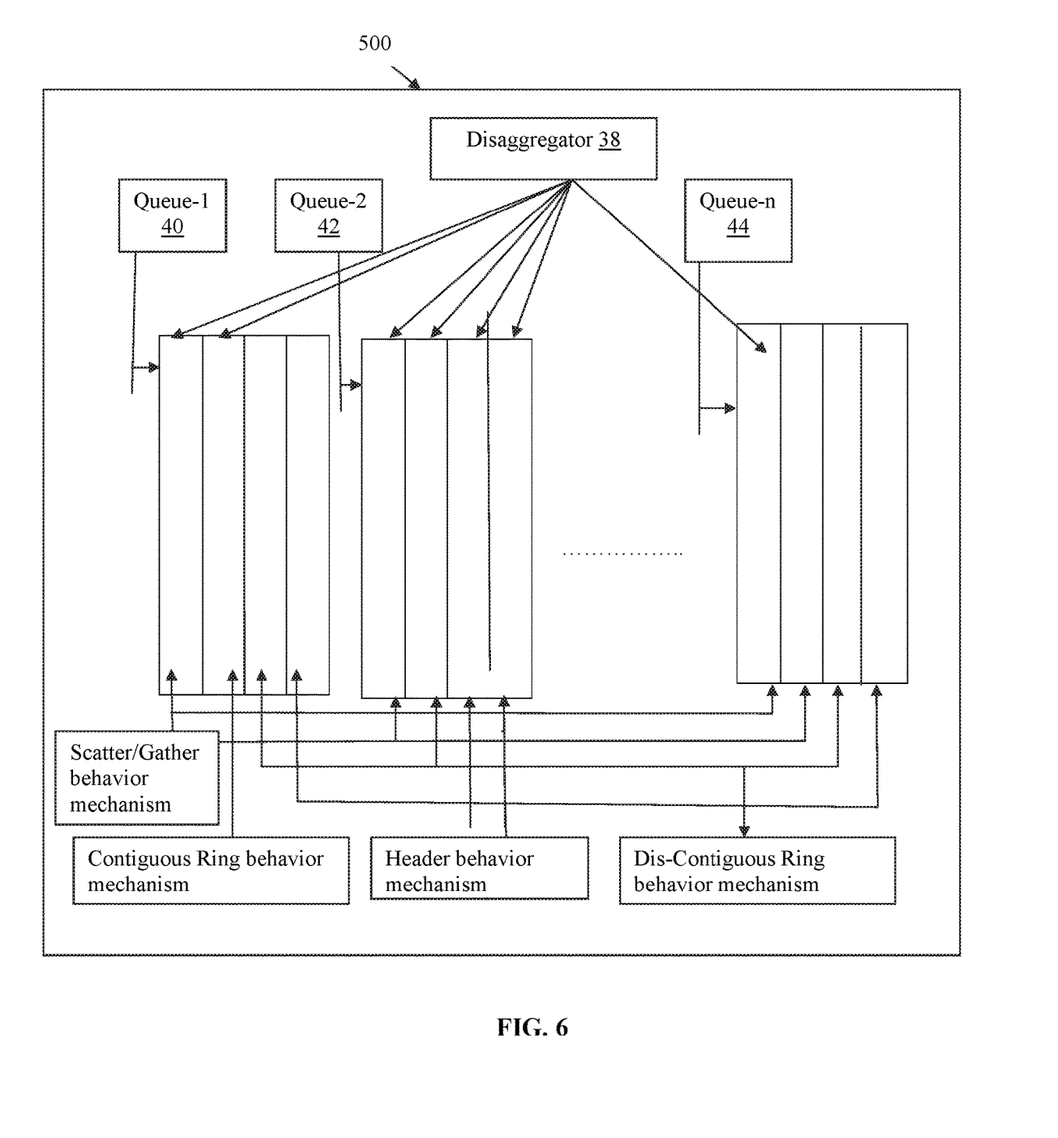
FIG. 6 is a functional block diagram of an example of a disaggregation in the exemplary method for traffic dependent direct memory access optimization shown in FIG. 5.
Figure 7:
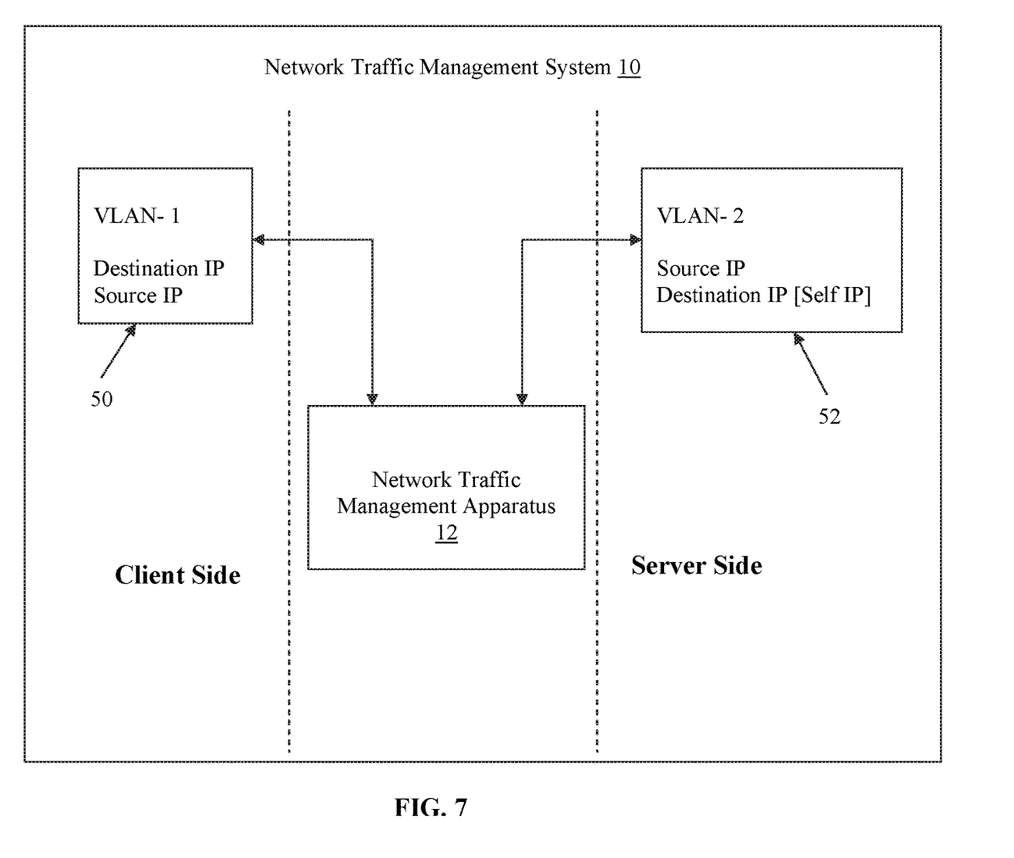
FIG. 7 is a functional block diagram of an example of filtering in the exemplary method for traffic dependent direct memory access optimization shown in FIG. 5.

Accordingly, the memory 22 of the network traffic management apparatus 12 can store one or more applications that can include computer executable instructions that, when executed by the network traffic management apparatus 12, cause the network traffic management apparatus 12 to perform actions, such as to transmit, receive, or otherwise process messages, for example, and to perform other actions described and illustrated below with reference to FIGS. 5-7. The application(s) can be implemented as components of other applications. Further, the application(s) can be implemented as operating system extensions, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the network traffic management apparatus 12 itself, may be located in virtual server(s) running in a cloud-based computing environment rather than being tied to one or more specific physical network computing devices. Also, the application(s) may be running in one or more virtual machines (VMs) executing on the network traffic management apparatus 12. Additionally, in one or more examples of this technology, virtual machine(s) running on the network traffic management apparatus 12 may be managed or supervised by a hypervisor.

In this particular example, the memory 22 of the network traffic management apparatus 12 may include a filtering criteria data storage 28, data store 32, profile data storage 30, although the memory 22 can include other policies, modules, databases, or applications, for example.

The filtering criteria stored in the filtering criteria data storage 28 may include by way of example, virtual local area network (VLAN) data criteria, listening data criteria, pool members data criteria, and self-internet protocol (IP) criteria, although other types and numbers of criteria may be used.

The profile data storage 30 may include profile data, such as Layer-4 Proxy Profile (L4 proxy profile), Partial Layer-7 proxy profile (Partial L7 proxy profile), Full Layer-7 proxy profile (Full L7 proxy profile) and associated rules for selecting one or more DMA behavior mechanisms.

The L4 proxy profile includes one or more policies used to make a determination about the particular processing of each packet. With the L4 proxy profile, processing is on a packet by packet basis and acknowledgements are not required which reduces overhead.

The Partial L7 proxy profile in the profile data storage 30 includes one or more policies for processing packets associated with a flow, such as HTTP packets by way of example. With the Partial L7 proxy profile, packets are processed on a per-flow-basis instead of packet by packet basis and then allocated to a particular one of the server devices 14(1)-14(n) based on one of plurality identified types of flow.

The Full L7 proxy profile in the profile data storage 30 also includes one or more policies for processing packets associated with a flow, such as HTTP packets by way of example. With the Full L7 proxy profile, all the packets associated with a flow are collected and then processed. By way of example, this processing may comprise examining the full stream of traffic for virus or attack signatures. By way of another example, this processing may include examining an HTTP request's URL for special processing such as compression, although other types of processing may be performed.

The stored associated rules are used to select one or more optimized DMA behavior mechanisms. By way of example only, one of the rules for selecting one of the DMA behavior mechanisms may comprise determining when a packet is processed using a L4 proxy profile. Upon determining the packet is processed using the L4 proxy profile, another one of the rules may be used to determine whether the Header DMA mechanism or the Contiguous Ring DMA mechanism is selected for processing the packet. In other examples, the rules may comprise determining whether a flow is being processed by either the Partial L7 proxy profile or the Full L7 proxy profile. Upon determining the packet is processed using either the Partial L7 proxy profile or the Full L7 proxy profile, then one of a plurality of DMA mechanisms may be selected for processing the packets in the flow.

Figure 4:
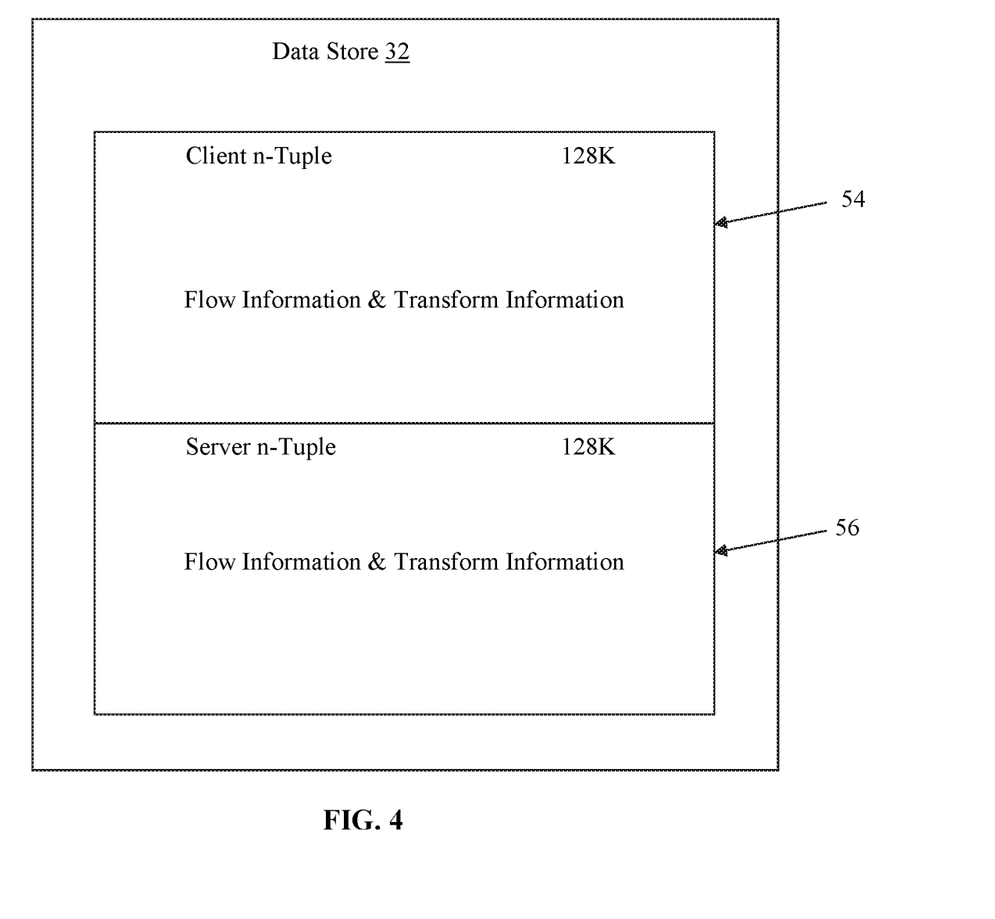
FIG. 4 is a block diagram of an example of a data store in the exemplary network traffic management apparatus shown in FIG. 2.

The data store 32 may store data from multiple data sources which may be utilized for DMA selection and may include a plurality of data entry tables. By way of a further example, the data store 32 is illustrated in FIG. 4. In this example, the data store 32 has a client n-tuple of 128K data entry table 54 for storing a set of client side flow information and transform information and a server n-tuple of 128K data entry table 56 for storing a set of server side flow information and transform information. The transform information may include for example information of translating the server side IP into a client side IP while responding to a client request or vice versa. Additionally, during a filtering process the filtering criteria, virtual local area network (VLAN) data criteria, listening data criteria, pool members data criteria, or self internet protocol (IP) criteria may compared against the data stored in the client n-tuples 54 and the server n-tuples 56 in the data store 32. The filtered header data may include a set of flow and transform information for example, source IP address, destination IP address, server source, pool member, and may be compared with the set of flow information and transform information stored in the client n-tuples 54 and the server n-tuples 56. When the filtered header data in the memory is replicated in the client n-tuples 54 and the server n-tuples 56, the replicated filtered data in the client n-tuples 54 and the server n-tuples 56 of the data store may be deleted or eliminated.

Referring to FIGS. 1-2 and 4, the Network Interface Controller (NIC) 24 of the network traffic management apparatus 12 operatively couples and communicates between the network traffic management apparatus 12, server devices 14(1)-14(n), and client devices 16(1)-16(n), which are coupled together at least in part by the communication network(s) 18(1) and 18(2), although other types or numbers of communication networks or systems with other types or numbers of connections or configurations to other devices or elements can also be used.

By way of example only, the communication network(s) 18(1) and 18(2) can include local area network(s) (LAN(s)) or wide area network(s) (WAN(s)), and can use TCP/IP over Ethernet and industry-standard protocols, although other types or numbers of protocols or communication networks can be used. The communication network(s) 18(1) and 18(2) in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

Figure 3:
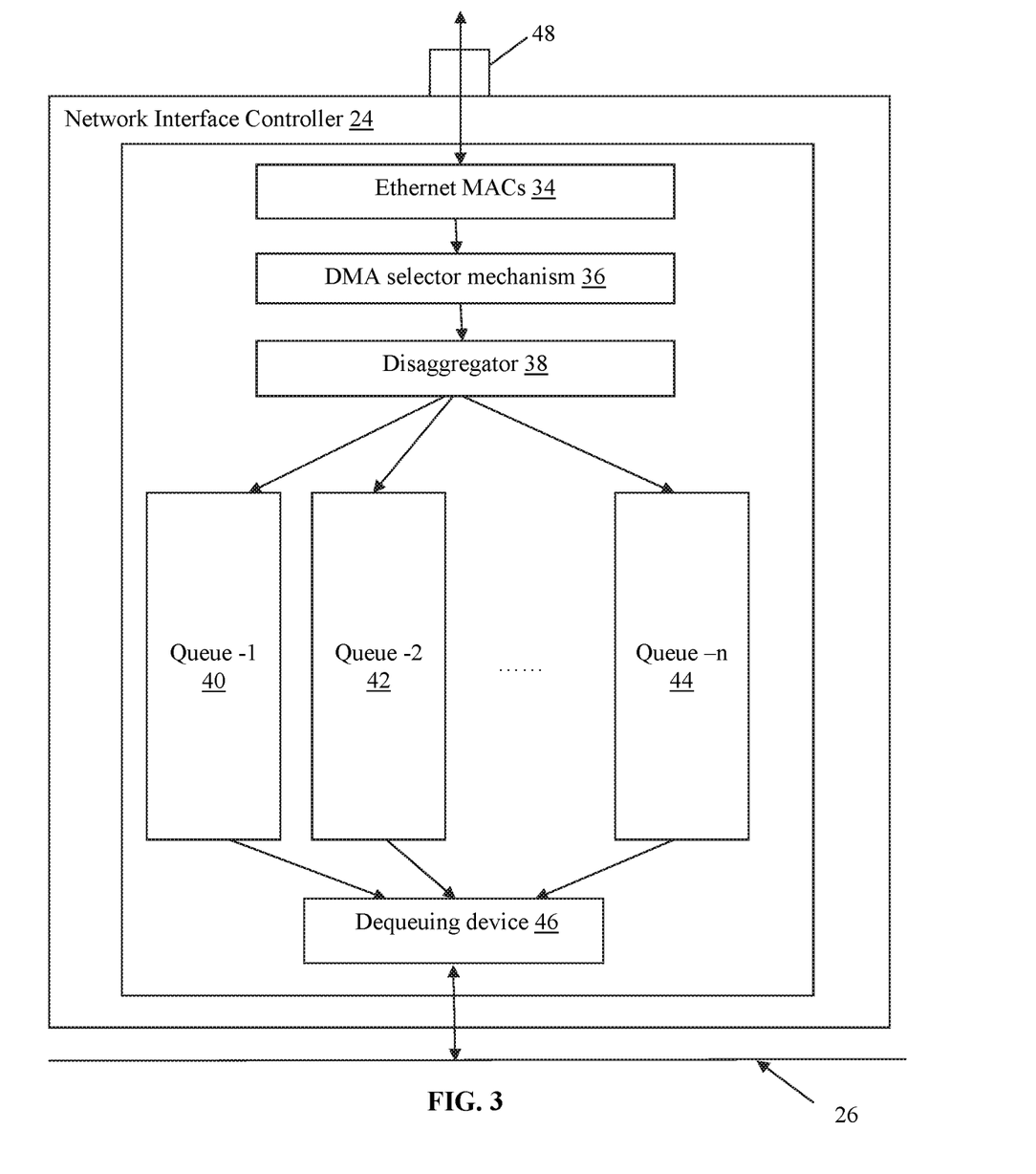
FIG. 3 is a functional block diagram of the Network Interface Controller in the exemplary network traffic management apparatus shown in FIG. 2.

Referring to FIG. 3, a functional block diagram of an example of the network interface controller 24 in the exemplary network traffic management apparatus 12 is illustrated, although other configurations for the network interface controller can be used. In this example, the network interface controller 24 is configured to receive packets by the Ethernet medium access control (MAC) or port 48 which are provided to a DMA selector mechanism 36. The DMA selector mechanism 36 that inspects, filters, and selects one or more DMA behavior mechanisms. Next, after the selection by the DMS selector mechanism 36, a disaggregartor 38 disaggregates each of the packets to one of the selected DMA behavior mechanisms in Queue-1 40 to Queue-n 44 to be processed and then output by a dequeuing device 46.

While the network traffic management apparatus 12 is illustrated in this example as including a single device, the network traffic management apparatus 12 in other examples can include a plurality of devices or blades each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the network traffic management apparatus 12.

Additionally, one or more of the devices that together comprise the network traffic management apparatus 12 in other examples can be stand-alone devices or integrated with one or more other devices or apparatuses, such as one or more of the server devices 14(1)-14(n), for example. Moreover, one or more of the devices of the network traffic management apparatus 12 in these examples can be in a same or a different communication network including one or more public, private, or cloud networks, for example.

Each of the server devices 14(1)-14(n) of the network traffic management system 10 in this example includes one or more processors, a memory, and a network interface controller, which are coupled together by a bus or other communication link, although other numbers and/or types of network devices could be used. The server devices 14(1)-14(n) in this example can include application servers, database servers, access control servers, or encryption servers, for example, that exchange communications along communication paths expected based on application logic in order to facilitate interactions with an application by users of the client devices 16(1)-16(n).

Accordingly, in some examples, one or more of the server devices 14(1)-14(n) process login and other requests received from the client devices 16(1)-16(n) via the communication network(s) 18(1) and 18(2) according to the HTTP-based application RFC protocol, for example. A web application may be operating on one or more of the server devices 14(1)-14(n) and transmitting data (e.g., files or web pages) to the client devices 16(1)-16(n) (e.g., via the network traffic management apparatus 12) in response to requests from the client devices 16(1)-16(n). The server devices 14(1)-14(n) may be hardware or software or may represent a system with multiple servers in a pool, which may include internal or external networks.

Although the server devices 14(1)-14(n) are illustrated as single devices, one or more actions of each of the server devices 14(1)-14(n) may be distributed across one or more distinct network computing devices that together comprise one or more of the server devices 14(1)-14(n). Moreover, the server devices 14(1)-14(n) are not limited to a particular configuration. Thus, the server devices 14(1)-14(n) may contain network computing devices that operate using a master/slave approach, whereby one of the network computing devices of the server devices 14(1)-14(n) operate to manage or otherwise coordinate operations of the other network computing devices. The server devices 14(1)-14(n) may operate as a plurality of network computing devices within a cluster architecture, a peer-to peer architecture, virtual machines, or within a cloud architecture, for example.

Thus, the technology disclosed herein is not to be construed as being limited to a single environment and other configurations and architectures are also envisaged. For example, one or more of the server devices 14(1)-14(n) can operate within the network traffic management apparatus 12 itself rather than as a stand-alone server device communicating with the network traffic management apparatus 12 via communication network(s) 18(2). In this example, the one or more of the server devices 14(1)-14(n) operate within the memory 22 of the network traffic management apparatus 12.

The client devices 16(1)-16(n) of the network traffic management system 10 in this example include any type of computing device that can exchange network data, such as mobile, desktop, laptop, or tablet computing devices, virtual machines (including cloud-based computers), or the like. Each of the client devices 16(1)-16(n) in this example includes a processor, a memory, and a communication interface, which are coupled together by a bus or other communication link (not illustrated), although other numbers or types of components could also be used.

The client devices 16(1)-16(n) may run interface applications, such as standard web browsers or standalone client applications, which may provide an interface to make requests for, and receive content stored on, one or more of the server devices 14(1)-14(n) via the communication network(s) 18(1) and 18(2). The client devices 16(1)-16(n) may further include a display device, such as a display screen or touchscreen, or an input device, such as a keyboard for example (not illustrated). Additionally, one or more of the client devices 16(1)-16(n) can be configured to execute software code (e.g., JavaScript code within a web browser) in order to log client-side data and provide the logged data to the network traffic management apparatus 12, as described and illustrated in more detail later.

Although the exemplary network traffic management system 10 with the network traffic management apparatus 12, server devices 14(1)-14(n), client devices 16(1)-16(n), and communication network(s) 18(1) and 18(2) are described and illustrated herein, other types or numbers of systems, devices, components, or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network security system 10, such as the network traffic management apparatus 12, server devices 14(1)-14(n), or client devices 16(1)-16(n), for example, may be configured to operate as virtual instances on the same physical machine. In other words, one or more of the network traffic management apparatus 12, server devices 14(1)-14(n), or client devices 16(1)-16(n) may operate on the same physical device rather than as separate devices communicating through communication network(s) 18(1) or 18(2). Additionally, there may be more or fewer network traffic management apparatuses, client devices, or server devices than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only, wireless traffic networks, cellular traffic networks, Packet Data Networks (PDNs), the Internet, intranets, and combinations thereof.

The examples may also be embodied as one or more non-transitory computer readable media having instructions stored thereon, such as in the memory 22, for one or more aspects of the present technology, as described and illustrated by way of the examples herein. The instructions in some examples include executable code that, when executed by one or more processors, such as the processor(s) 20, cause the processors to carry out steps necessary to implement the methods of the examples of this technology that are described and illustrated herein.

An exemplary method of traffic dependent DMA behavior will now be described with reference to FIGS. 1-7. Referring more specifically to FIG. 5, in step 500 in this example, the network traffic management apparatus 12 receives a plurality of packets from the client devices 16(1)-16(n) requesting a service at network interface controller 24, although the packets could be received from other sources. Each of the plurality of packets may include a variety of different types of data, such as packet header data and payload data by way of example.

In step 510, the network traffic management apparatus 12 performs an inspection of the packet header data in each of the plurality of packets to determine source address data and destination address data from the packet header data, although other types of data in each of the plurality of packets could be inspected and determined.

In step 520, the network traffic management apparatus 12 filters the determined source address data and destination address data from the packet header data for each packet using one or more filtering criteria stored in the filtering criteria data storage 28 to obtain filtered data, although other data may be filtered from the packet header data. The stored filtering criteria may include by way of example, virtual local area network (VLAN) data criteria, listening data criteria, pool members data criteria, self-internet protocol (IP) criteria and/or tenant account data described further in detail below. Examples of this filtering using the virtual local area network (VLAN) data criteria are described below with reference to FIG. 7.

In this example, when the received packet is originating from a client request, and the packet is received over, for example, a VLAN 1, the packet header data is inspected to obtain a destination address data, such as a destination IP address of 10.0.0.1:80 which is a virtual server internet protocol (IP) address. The network traffic management apparatus 12 may map this virtual server IP address to stored profile data associated with for example an L4 proxy profile. This process of mapping the virtual server IP address to the profile data is considered filtering with VLAN data criteria.

In another example, when the received packet is originating from a server response and the packet is received over, for example a VLAN 2, the packet header is inspected to obtain a source address data, such as a source IP address and the port number. Since this is a response coming in from the server for which earlier load balancing decisions had been made based on the earlier client request packet header data which was associated with for example, the L4 proxy profile, this packet that is associated with the server response will also be associated with the L4 proxy profile associated with the client request by the network traffic management apparatus. Since the L4 proxy profile in this example is associated with, for example the contiguous ring DMA behavior mechanism, then the contiguous ring DMA behavior mechanism is selected to service this packet associated with the server response. This process of mapping the server response to the profile data based on listening for the client request profile is considered filtering with listening data criteria. Although two examples of filtering are provided above with reference to FIG. 7, other types filtering may be used.

By way of another example, when the network traffic management system 10 is providing TCP stack load balancing with URL matching with TLS decryption, then the network traffic management apparatus 12 may filter from the packet header data source IP which may be matched to identify packets in received traffic for load balancing.

In another example, when the network traffic management system 10 is providing network address translation (NAT'ing) behavior, then the network traffic management apparatus 12 may filter from the packet header data in received packets the local host's IP address (self-IP) in the destination IP to be used in NAT'ing behaviour. This example represents traffic where only the headers need be examined to provide the translation service.

In yet another example, a security engine in or associated with the network traffic management apparatus 12 may have determined that a specific IP time to live field value has been associated with hacker activity in traffic. Accordingly, in this example, the network traffic management apparatus 12 may filter packets in traffic matching this criteria and would send those matching packets to a full L7 proxy for deep inspection.

In step 530, the network traffic management apparatus 12 may select one or more optimized DMA behavior mechanisms from a plurality of optimized DMA behavior mechanisms for each of the packets based on the filtered packet header data. For example, the filtering which mapped the packet header data to the L4 proxy profile can now be used to select either a header behavior mechanism or contiguous ring mechanism for the packet based on the association with the L4 proxy profile. In other examples, the filtering associates the packets with other proxy profiles which are correlated to other DMA behavior mechanisms. In other examples, the filtering may select DMA behavior based on a comparison of packet length against MTU. A NAT'ing application that also employs IP fragmentation may choose to direct packets for fragmentation through a contiguous ring instead of header mechanism. In other examples, the ingress physical port may also be used in the filtering process. In a URL examination example, packets arriving from a client warrant examination and thus require a contiguous ring. Packet from servers will only require header mechanism. If the ingress physical port can be used to distinguish client from server, then the ingress physical port will be used in the filtering mechanism to select DMA behavior.

By way of example, other exemplary types of DMA behavior mechanisms which may be selected may include the scatter/gather mechanism, the contiguous ring mechanism, the dis-contiguous ring mechanism and the header behavior mechanism, although other types and/or numbers of mechanisms may be used.

With the scatter/gather mechanism, a single procedure call sequentially reads data from multiple buffers and writes it to a single data stream, or reads data from a data stream and writes it to multiple buffers. The buffers are given in a vector of buffers, and the packets in this scatter/gather mechanism are long lived. The scatter/gather mechanism refers to the process of gathering data from, or scattering data into, the given set of buffers. A scatter/gather I/O can operate synchronously or asynchronously and may be used for efficiency and convenience.

With the contiguous ring mechanism, upon receiving the packets from the client, a buffer holds the packets for a pre-determined period of time before the packets are transmitted to the server. With this contiguous ring mechanism, the packets arrive inline and are processed in a standard manner upon arrival. The size of the contiguous ring dictates the amount of data that can be stored and a fixed maximum speed of data transfer provides a maximum time in which the incoming packet must be processed.

The dis-contiguous ring mechanism is an optimized form of the contiguous ring mechanism. The dis-contiguous ring mechanism resembles the contiguous ring mechanism, however with the dis-contiguous ring mechanism when the data arrives a determination is made to identify which of the arrived data requires a longer processing time than a threshold. Upon the determining that data requires a longer processing time, that data is skipped which may result in holes or gaps in the buffer for this skipped data.

With the header behavior mechanism, upon receiving the packets the packet header data, payload data including predictably located values may be inspected and based on the inspected data the packets are then forwarded.

In step 540, the network traffic management apparatus 12 disaggregates each of the plurality of incoming packets based on the corresponding selected one of the optimized DMA behavior mechanisms to the one or more queues, wherein the queues are a data structure for processing packets as illustrated by way of example back in FIG. 3. In this example, the packets are disaggregated by the disaggregator 38 into one of the Queue-1 40 to Queue-n 44 to be processed using the selected DMA behavior mechanisms for the particular Queue-1 40 to Queue-n 44, such as the selected scatter/gather mechanism, contiguous ring mechanism, header behavior mechanism, or dis-contiguous ring behavior mechanism by way of example.

Accordingly, as illustrated by way of the examples herein, an increased efficiency with network load balancing is provided by this technology intelligently processing different types of traffic with an associated DMA behavior mechanism which improves CPU, CPU cache, DRAM or Bus Bandwidth utilization resulting in improved experience for users of client devices. As a result, this technology provides advantages of optimized utilization of NIC storage to eliminate duplicated data to reduce size of entry tables which reduces costs for utilizing expensive storage devices.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for filtering and processing incoming packets implemented by a network traffic management system comprising one or more network traffic management apparatuses, server devices or client devices, the method comprising:
  inspecting an incoming packet to obtain packet header data;
  filtering the obtained packet header data for the incoming packet using a filtering criteria;
  associating the filtered header data for the incoming packet with a stored network profile data, wherein the stored network profile data comprises proxy profiles and wherein the filtered header data comprises filtered source address data or destination address data from the packet header data which are associated with the proxy profiles;
  selecting an optimized one of a plurality DMA behavior mechanism for the incoming packet based on the associated stored network profile data by using the proxy profiles associated with the filtered header data, the proxy profiles being correlated to one of the DMA behavior mechanisms, wherein the proxy profiles comprise a layer-4 proxy profile, a partial layer-7 proxy profile, or a full layer-7 proxy profile; and
  disaggregating the incoming packet based on the corresponding selected optimized one of the plurality DMA behavior mechanism.

2. The method of claim 1, wherein the stored profile data comprises a rule for selecting the optimized DMA behavior mechanism; and
  wherein the optimized DMA behavior mechanism comprise a scatter and gather mechanism, a contiguous ring mechanism, a dis-contiguous ring mechanism, or a header behavior mechanism.

3. The method of claim 1, wherein the filtering criteria comprises virtual local area network (VLAN) data criteria, listening data criteria, pool members data criteria, or self-internet protocol (IP) criteria.

4. The method of claim 3, wherein the filtering the obtained packet header data for the incoming packet further comprises filtering using the listening data criteria, wherein the listening data criteria comprises listening for a virtual server internet protocol (IP) address; and
  wherein the selecting further comprises selecting the contiguous ring mechanism or the header behavior mechanism for disaggregating the incoming packet, upon determining that the virtual server IP address matches a rule for selecting the contiguous ring mechanism or the header behavior mechanism.

5. The method of claim 1, further comprising
selecting the optimized DMA behavior mechanism based a policy associated with a tenant.

6. A network traffic management apparatus, comprising a memory comprising programmed instructions stored thereon and one or more processors configured to be capable of executing the stored programmed instructions to:
  inspect an incoming packet to obtain packet header data;
  filter the obtained packet header data for the incoming packet using a filtering criteria;
  associate the filtered header data for the incoming packet with a stored network profile data, wherein the stored network profile data comprises proxy profiles and wherein the filtered header data comprises filtered source address data or destination address data from the packet header data which are associated with the proxy profiles;
  select an optimized one of a plurality DMA behavior mechanism for the incoming packet based on the associated stored network profile data by using the proxy profiles associated with the filtered header data, the proxy profiles each being correlated to one of the DMA behavior mechanisms, wherein the proxy profiles comprise a layer-4 proxy profile, a partial layer-7 proxy profile, or a full layer-7 proxy profile; and
  disaggregate the incoming packet based on the corresponding selected optimized one of the plurality DMA behavior mechanism.

7. The network traffic management apparatus of claim 6, wherein the stored profile data comprises a rule for selecting the optimized DMA behavior mechanism; and
  wherein the optimized DMA behavior mechanism comprise a scatter and gather mechanism, a contiguous ring mechanism, a dis-contiguous ring mechanism, or a header behavior mechanism.

8. The network traffic management apparatus of claim 6, wherein the one or more filtering criteria comprises virtual local area network (VLAN) data criteria, listening data criteria, pool members data criteria, or self-internet protocol (IP) criteria.

9. The network traffic management apparatus of claim 8, wherein the one or more processors are further configured to be capable of executing the stored programmed instructions for the filter and the select to:
  filter using the listening data criteria, wherein the listening data criteria comprises listening for a virtual server internet protocol (IP) address; and
  select the contiguous ring mechanism or the header behavior mechanism for disaggregating the incoming packet, upon determining that the virtual server IP address matches a rule for selecting the contiguous ring mechanism or the header behavior mechanism.

10. The network traffic management apparatus of claim 6, wherein the one or more processors are further configured to be capable of executing the stored programmed instructions to:
  select the optimized DMA behavior mechanism based a policy associated with a tenant.

11. A non-transitory computer readable medium having stored thereon instructions for filtering and processing incoming packets comprising executable code which when executed by one or more processors, causes the one or more processors to:
  inspect an incoming packet to obtain packet header data;
  filter the obtained packet header data for the incoming packet using a filtering criteria;
  associate the filtered header data for the incoming packet with a stored network profile data, wherein the stored network profile data comprises proxy profiles and wherein the filtered header data comprises filtered source address data or destination address data from the packet header data which are associated with the proxy profiles;
  select an optimized one of a plurality DMA behavior mechanism for the incoming packet based on the associated stored network profile data by using the proxy profiles associated with the filtered header data, the proxy profiles each being correlated to one of the DMA behavior mechanisms, wherein the proxy profiles comprise a layer-4 proxy profile, a partial layer-7 proxy profile, or a full layer-7 proxy profile; and
  disaggregate the incoming packet based on the corresponding selected optimized one of the plurality DMA behavior mechanism.

12. The non-transitory computer readable medium of claim 11, wherein the stored profile data comprises a rule for selecting the optimized DMA behavior mechanism; and wherein the optimized DMA behavior mechanism comprise a scatter and gather mechanism, a contiguous ring mechanism, a dis-contiguous ring mechanism, or a header behavior mechanism.

13. The non-transitory computer readable medium of claim 11, wherein the one or more filtering criteria comprises virtual local area network (VLAN) data criteria, listening data criteria, pool members data criteria, or self-internet protocol (IP) criteria.

14. The non-transitory computer readable medium of claim 13, wherein the executable code when executed by the one or more processors further causes the one or more processors for the filter and the select to:
  filter using the listening data criteria, wherein the listening data criteria comprises listening for a virtual server internet protocol (IP) address; and
  select the contiguous ring mechanism or the header behavior mechanism for disaggregating the incoming packet, upon determining that the virtual server IP address matches a rule for selecting the contiguous ring mechanism or the header behavior mechanism.

15. The non-transitory computer readable medium of claim 11, wherein the executable code when executed by the one or more processors further causes the one or more processors to:
  select the optimized DMA behavior mechanism based a policy associated with a tenant.

16. A network traffic management system, comprising one or more traffic management apparatuses, client devices, or server devices, the network traffic management system comprising memory comprising programmed instructions stored thereon and one or more processors configured to be capable of executing the stored programmed instructions to:
  inspect an incoming packet to obtain packet header data;
  filter the obtained packet header data for the incoming packet using a filtering criteria;
  associate the filtered header data for the incoming packet with a stored network profile data, wherein the stored network profile data comprises proxy profiles and wherein the filtered header data comprises filtered source address data or destination address data from the packet header data which are associated with the proxy profiles;
  select an optimized one of a plurality DMA behavior mechanism for the incoming packet based on the associated stored network profile data by using the proxy profiles associated with the filtered header data, the proxy profiles each being correlated to one of the DMA behavior mechanisms, wherein the proxy profiles comprise a layer-4 proxy profile, a partial layer-7 proxy profile, or a full layer-7 proxy profile; and
  disaggregate the incoming packet based on the corresponding selected optimized one of the plurality DMA behavior mechanism.

17. The network traffic management system of claim 16, wherein the stored profile data comprises a rule for selecting the optimized DMA behavior mechanism; and
  wherein the optimized DMA behavior mechanism comprise a scatter and gather mechanism, a contiguous ring mechanism, a dis-contiguous ring mechanism, or a header behavior mechanism.

18. The network traffic management system of claim 16, wherein the one or more filtering criteria comprises virtual local area network (VLAN) data criteria, listening data criteria, pool members data criteria, or self-internet protocol (IP) criteria.

19. The network traffic management system of claim 18, wherein the one or more processors are further configured to be capable of executing the stored programmed instructions for the filter and the select to:
  filter using the listening data criteria, wherein the listening data criteria comprises listening for a virtual server internet protocol (IP) address; and
  select the contiguous ring mechanism or the header behavior mechanism for disaggregating the incoming packet, upon determining that the virtual server IP address matches a rule for selecting the contiguous ring mechanism or the header behavior mechanism.

20. The network traffic management system of claim 16, wherein the one or more processors are further configured to be capable of executing the stored programmed instructions to:
  select the optimized DMA behavior mechanism based a policy associated with a tenant.

* * * * *